(12) United States Patent
Kawamura et al.

(10) Patent No.: US 10,341,499 B2
(45) Date of Patent: Jul. 2, 2019

(54) COMMUNICATION TERMINAL DEVICE, INCOMING CALL CONTROL METHOD, AND PROGRAM

(71) Applicant: NTT DOCOMO, INC., Tokyo (JP)

(72) Inventors: Satoru Kawamura, Tokyo (JP); Nobuto Arai, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/542,637

(22) PCT Filed: Jan. 18, 2016

(86) PCT No.: PCT/JP2016/051258
§ 371 (c)(1),
(2) Date: Jul. 10, 2017

(87) PCT Pub. No.: WO2016/114402
PCT Pub. Date: Jul. 21, 2016

(65) Prior Publication Data
US 2018/0124256 A1 May 3, 2018

(30) Foreign Application Priority Data
Jan. 16, 2015 (JP) .................................. 2015-007088

(51) Int. Cl.
*H04B 1/38* (2015.01)
*H04M 19/04* (2006.01)
(Continued)

(52) U.S. Cl.
CPC .............. *H04M 19/04* (2013.01); *G06F 3/01* (2013.01); *H04M 1/00* (2013.01)

(58) Field of Classification Search
CPC .......... H04M 1/64; H04M 19/04; H04M 1/00; G06F 3/01
(Continued)

(56) References Cited

U.S. PATENT DOCUMENTS 8,706,162 B1 * 4/2014 Abrahamsson ....... H04M 1/605
455/556.1
2011/0237306 A1 * 9/2011 Kamii ............... H04M 1/72519
455/566
(Continued)

FOREIGN PATENT DOCUMENTS

JP 63304753 A 12/1988
JP 02054658 A 2/1990
(Continued)

OTHER PUBLICATIONS

International Search Report for Corresponding PCT Application No. PCT/JP2016/051258, dated Apr. 5, 2016.
(Continued)

*Primary Examiner* — Md K Talukder
(74) *Attorney, Agent, or Firm* — MKG LLC

(57) ABSTRACT

A communication terminal device is a mobile communication terminal device that carries out communication for voice calls. In the case where an incoming voice call is received, the communication terminal device measures an orientation and a displacement of the device itself, and determines whether or not a condition occurring when a user picks up the device in his/her hand is met. After determining that the condition occurring when a user picks up the device in his/her hand is met, in the case where the communication terminal device determines that the device is detected as being near the user's head area and furthermore determines that an utterance from the user has been detected while the user's head area is detected as being near, the device carries out a notification processing for notifying the user that a response to the incoming call will be made, after which the response to the incoming call is made.

9 Claims, 13 Drawing Sheets

(51) Int. Cl.
*G06F 3/01* (2006.01)
*H04M 1/00* (2006.01)

(58) Field of Classification Search
USPC .............................................. 455/412.1–413
See application file for complete search history.

(56) References Cited

U.S. PATENT DOCUMENTS

| | | | | |
|---|---|---|---|---|
| 2011/0306304 | A1* | 12/2011 | Forutanpour | G06F 3/04883 455/67.11 |
| 2012/0244911 | A1* | 9/2012 | Endo | H04M 1/72552 455/566 |
| 2013/0023248 | A1* | 1/2013 | Lee | H04W 4/026 455/414.1 |
| 2013/0034234 | A1* | 2/2013 | Chen | H04M 1/72591 381/58 |
| 2013/0332156 | A1* | 12/2013 | Tackin | H04M 1/6041 704/226 |
| 2014/0302893 | A1* | 10/2014 | Dhavaloganathan | H04M 1/72577 455/566 |
| 2014/0357251 | A1* | 12/2014 | Forutanpour | H04M 1/6008 455/418 |
| 2015/0207912 | A1* | 7/2015 | Gulliksson | H04M 1/7253 455/418 |
| 2017/0353797 | A1* | 12/2017 | Hosoi | H04R 1/02 |
| 2018/0124255 | A1* | 5/2018 | Kawamura | G06F 3/01 |
| 2018/0124256 | A1* | 5/2018 | Kawamura | G06F 3/01 |

FOREIGN PATENT DOCUMENTS

| | | |
|---|---|---|
| JP | 09186757 A | 7/1997 |
| JP | 2000341376 A | 12/2000 |
| JP | 2002325279 A | 11/2002 |
| JP | 2009063563 A | 3/2009 |
| JP | 2013236201 A | 11/2013 |
| JP | 2014127754 A | 7/2014 |
| WO | 2014010272 A1 | 1/2014 |

OTHER PUBLICATIONS

Office Action issued in corresponding Japanese Patent Application No. 2016-569533 dated May 8, 2018, 5 pages.
Extended European Search Report issued in corresponding European Application No. 16737473.5 dated Apr. 30, 2018, 8 pages.

* cited by examiner (A)

(B)

(C)

(D)

(E)

(F)

COMMUNICATION TERMINAL DEVICE, INCOMING CALL CONTROL METHOD, AND PROGRAM

TECHNICAL FIELD

The present invention relates to techniques for responding to incoming voice calls.

BACKGROUND ART

JP2013-236201A and JP2014-127754A disclose techniques for responding to an incoming voice call to a cellular phone without a user operating an operating unit. JP2013-236201A discloses a cellular phone that, in the case where it is determined that the phone is in a predetermined orientation, transits from a call receiving state to a voice call state under the condition that a proximity sensor located in the vicinity of a mouthpiece detects that the phone is near an operator's ear and a rear-side proximity sensor does not detect an object such as a table. JP2014-127754A discloses a cellular phone responding to an incoming call and executing voice call processing in the case where it is detected that the phone has approached a user.

JP2014-127754A also discloses a cellular phone placing a response into an on-hold state in the case where the phone detects that a user is not holding the phone after a call is received, and stopping the transmission of inputted voice in the case where the phone detects that the user has moved away after voice call processing has started. JP-S63-304753A discloses a phone placing a voice call in an on-hold state in the case where it is detected that a receiver of the phone has been placed horizontally.

SUMMARY

According to the technique disclosed in JP2013-236201A, when the cellular phone is in a purse, for example, the phone is in a predetermined orientation; furthermore, in the case where an object within the purse is detected by the proximity sensor near the mouthpiece but the rear-side proximity sensor does not detect an object, the phone will respond to an incoming call. According to the technique disclosed in JP2014-127754A, the cellular phone will respond to an incoming call in the case where the phone has detected even an object that is not the user approaching. Thus with the techniques disclosed in JP2013-236201A and JP2014-127754A, the phones may respond to an incoming call even in states where the user cannot make a voice call.

In light of this, it is an object of the present invention to provide a technique for responding to an incoming voice call without a user operating an operating unit, under the condition that the user is in a state where s/he can make the voice call.

To solve the above-described problems, a communication terminal device according to the present invention is a mobile communication terminal device comprising: an answering unit that responds to an incoming voice call; a measurement unit that measures an orientation or a displacement of the communication terminal device; a proximity detection unit that detects when a head area of a user is near the communication terminal device; and an operation detection unit that detects a predetermined operation being made by the user using the communication terminal device. The answering unit responds to the incoming call in the case where, after the measured orientation or displacement has met a predetermined condition, the head area is detected as being near and the operation is detected while the head area is detected as being near.

In the communication terminal device according to the present invention, the condition may be expressed as a change in the orientation over time.

In the communication terminal device according to the present invention, the device may further include: a storage unit that stores, in advance, voice data expressing voice inputted by the user; and a voice transmission control unit that sends the voice expressed by the stored voice data in the case where the voice call has been started by the response.

In the communication terminal device according to the present invention, the operation may be input of the user's voice, and the device may further include: a storage unit that stores voice data; a storage control unit that causes the voice data expressing the inputted user's voice to be stored in the storage unit; and a voice transmission control unit that sends the voice expressed by the stored voice data in the case where the voice call has been started by the response.

The communication terminal device according to the present invention may further include: a hangup control unit that, in the case where the orientation occurring when the incoming call was received has been measured after the voice call is started by the response, terminates the voice call.

In this communication terminal device, the hangup control unit may terminate the voice call in the case where the first orientation occurring when the incoming call was received has been measured after the voice call is started by the response. Alternatively, wherein the hangup control unit may terminate the voice call in the case where a change in the orientation over time or the displacement measured after the voice call has been started by the response is the reverse of a change in the orientation over time or the displacement measured when the incoming call was received.

The communication terminal device according to the present invention may further include: a hangup control unit that terminates the voice call in the case where, after the voice call has been started by the response, a predetermined keyword is recognized from voice inputted by the user and the head area is furthermore no longer detected as being near.

An incoming call control method according to the present invention is an incoming call control method for a mobile communication terminal device, and includes: a step of responding to an incoming voice call; a step of measuring an orientation or a displacement of the communication terminal device; a step of detecting when a head area of a user is near the communication terminal device; and a step of detecting a predetermined operation being made by the user using the communication terminal device. In the step of responding, a response to the incoming call is made in the case where, after the measured orientation or displacement has met a predetermined condition, the head area is detected as being near and the operation is detected while the head area is detected as being near.

A program according to the present invention is a program for causing a computer of a mobile communication terminal device to execute: a step of responding to an incoming voice call; a step of measuring an orientation or a displacement of the communication terminal device; a step of detecting when a head area of a user is near the communication terminal device; and a step of detecting a predetermined operation being made by the user using the communication terminal device. In the step of responding, a response to the incoming call is made in the case where, after the measured orientation or displacement has met a predetermined condition, the head area is detected as being near and the operation is detected while the head area is detected as being near.

According to the present invention, a technique for responding to an incoming voice call without a user operating an operating unit, under the condition that the user is in a state where s/he can make the voice call, can be provided.

DETAIL DESCRIPTION

Embodiments of the present invention will now be described with reference to the drawings.

First Embodiment

Figure 1:
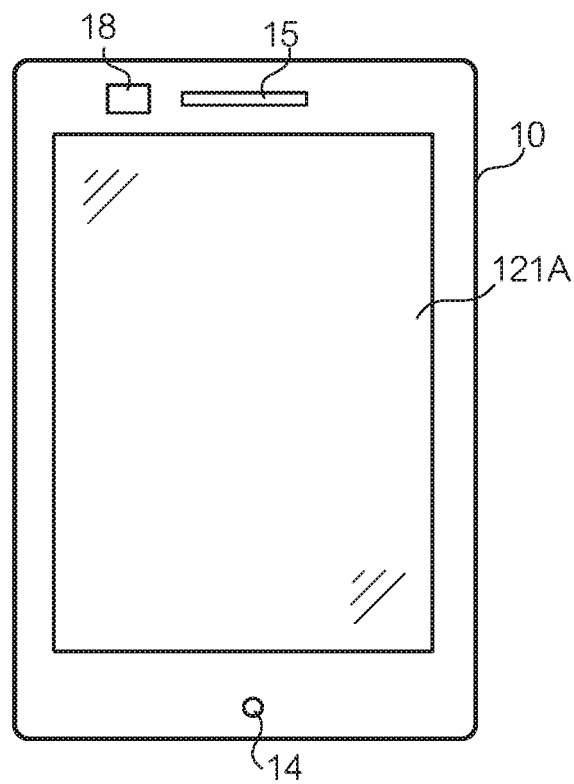
FIG. 1 is a front view of a communication terminal device according to a first embodiment of the present invention.

FIG. 1 is a front view of communication terminal device 10 according to a first embodiment of the present invention. Communication terminal device 10 is a mobile communication terminal device used while a user holds the device in his/her hand. In the present embodiment, communication terminal device 10 is a smartphone. Communication terminal device 10 has the same external appearance as a generic smartphone, and is formed in a substantially parallelepiped shape.

Communication terminal device 10 sends and receives voice for the purpose of voice calls. Communication terminal device 10 includes microphone 14 and speaker 15 on a front surface side thereof. Microphone 14 is a device for inputting voice to be sent. Microphone 14 is disposed in a location near the mouth of the user making a voice call. Speaker 15 is a device for outputting voice that is received. Speaker 15 is disposed in a location near the head area (and more specifically, an ear) of the user making a voice call.

Communication terminal device 10 further includes display region 121A and proximity sensor 18 on the front surface side thereof. Display region 121A is a region in which an image (a screen) of display unit 121, which will be described later, is displayed. Proximity sensor 18 is provided adjacent to speaker 15, and is a sensor for detecting when the user's head area is near.

Figure 2:
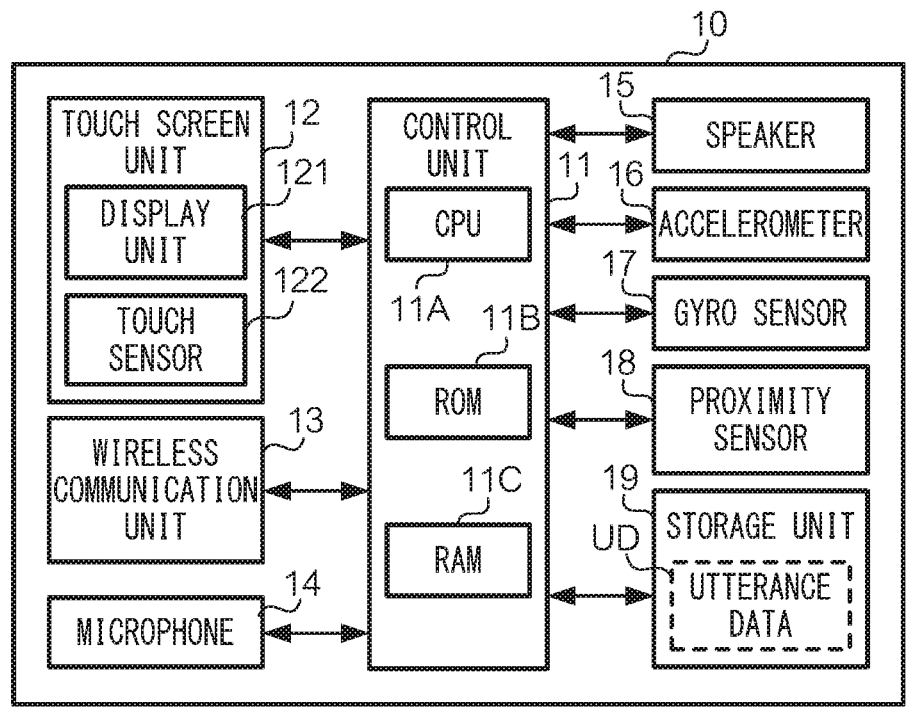
FIG. 2 is a block diagram illustrating the hardware configuration of the communication terminal device according to the same embodiment.

FIG. 2 is a block diagram illustrating the hardware configuration of communication terminal device 10. As illustrated in FIG. 2, communication terminal device 10 includes control unit 11, touch screen unit 12, wireless communication unit 13, microphone 14, speaker 15, accelerometer 16, gyrosensor 17, proximity sensor 18, and storage unit 19.

Control unit 11 is a processor including Central Processing Unit (CPU) 11A, which serves as a computation processing device, Read-Only Memory (ROM) 11B, and Random Access Memory (RAM) 11C, which serves as a work area. CPU 11A controls the various elements of communication terminal device 10 by reading out programs stored in ROM 11B or storage unit 19 into RAM 11C and executing those programs. Control unit 11 carries out control for voice calls, for example.

Touch screen unit 12 includes display unit 121 and touch sensor 122. Display unit 121 is a liquid crystal display, for example, and displays images in display region 121A (see FIG. 1). Touch sensor 122 is a sensor provided in a planar shape overlapping display region 121A, and detects a user operation made on display region 121A in accordance with a predetermined system (for example, a resistive film system or an electrostatic capacitance system).

Wireless communication unit 13 has a wireless communication circuit and an antenna, and carries out wireless communication. Wireless communication unit 13 is a communication unit that is connected to a telephone line, which is not illustrated, and at least carries out communication for voice calls. Wireless communication unit 13 receives incoming voice calls and makes outgoing calls to partners of voice calls, for example.

Microphone 14 converts voice inputted by the user into a voice signal. Speaker 15 converts a supplied voice signal into voice and outputs the resulting voice.

Accelerometer 16 is a three-axis accelerometer, for example, and is a sensor that measures an acceleration acting on communication terminal device 10. Accelerometer 16 is used to measure an orientation or a displacement (movement) of communication terminal device 10. Gyrosensor (angular velocity sensor) 17 is a three-axis angular velocity sensor, for example, and is a sensor that measures an angular velocity acting on communication terminal device 10. Gyrosensor 17 is used to measure the orientation of communication terminal device 10.

The orientation of communication terminal device 10 at various points in time is specified on the basis of a tilt (rotation angle) from a reference direction of communication terminal device 10. The displacement of communication terminal device 10 is specified on the basis of, for example, a trajectory along which communication terminal device 10 moves. This trajectory is specified on the basis of, for example, a combination of a distance communication terminal device 10 has moved and a direction of that movement.

Proximity sensor 18 is a sensor for detecting when the user's head area is near. Proximity sensor 18 is an induction-type or electrostatic capacitance-type proximity sensor, for example, and detects when an object has come within a predetermined distance. Proximity sensor 18 can detect when an object is near on the basis of whether the object is in a state of no contact or a state of contact.

Storage unit 19 has an Electronically Erasable and Programmable ROM (EEPROM) or a flash memory, for example, and stores various types of data. Storage unit 19 stores various types of programs such as an Operating System (OS) installed in communication terminal device 10 and programs that run on the OS. "Utterance data UD" indicated in FIG. 2 is voice data used in the second embodiment and the third embodiment, which will be described later.

Communication terminal device 10 has an automatic response function that, in the case where there is an incoming voice call, responds to that incoming call without the user operating an operating unit. Communication terminal device 10 also has a hold/hangup function that, during a voice call, puts the voice call on hold or hangs up without the user operating the operating unit.

Figure 3:
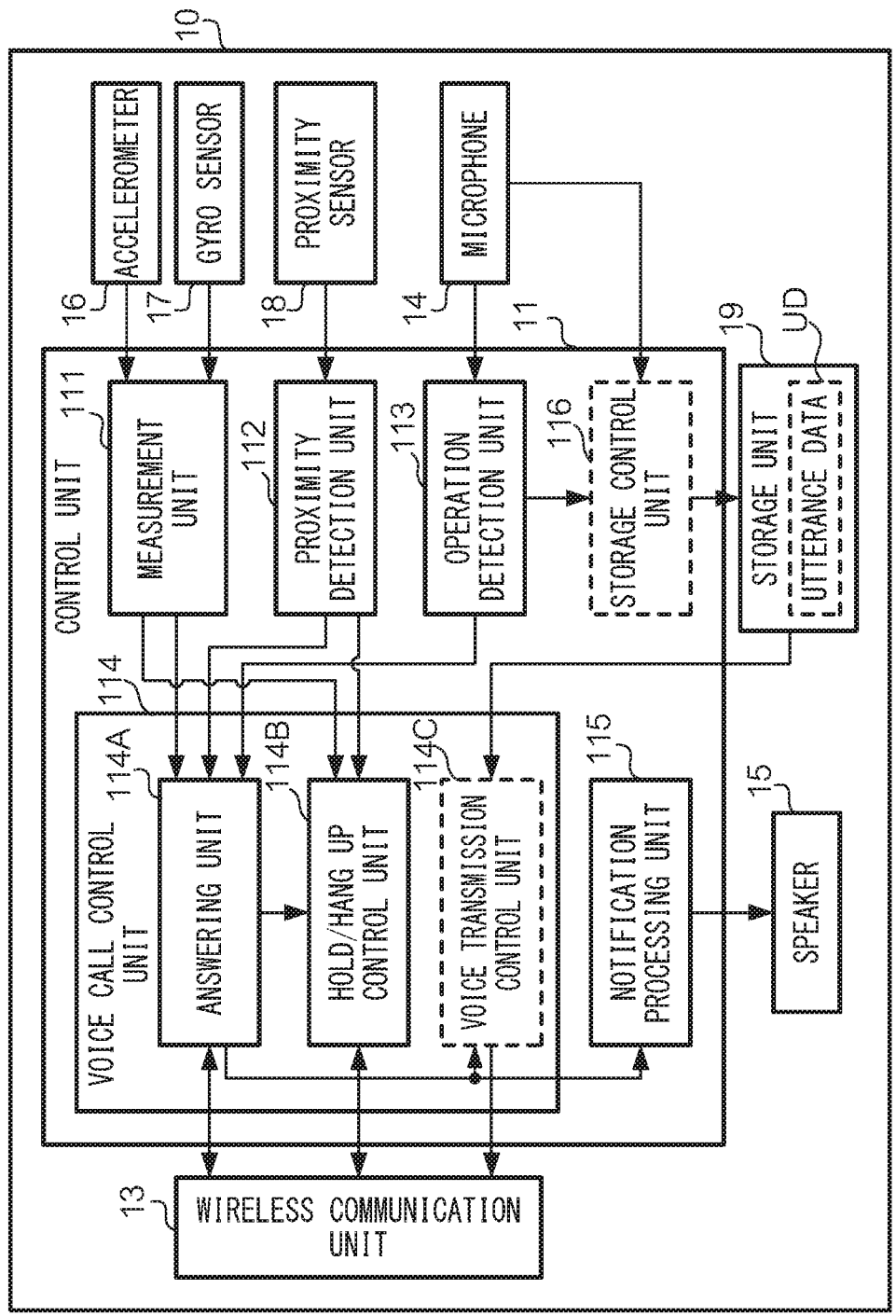
FIG. 3 is a block diagram illustrating the functional configuration of a control unit according to the same embodiment.

FIG. 3 is a block diagram illustrating the functional configuration of control unit 11. Control unit 11 realizes functions corresponding to measurement unit 111, proximity detection unit 112, operation detection unit 113, voice call control unit 114, and notification processing unit 115 by executing programs. "Voice transmission control unit 114C" indicated in FIG. 3 is a function pertaining to the second embodiment and the third embodiment, which will be described later. "Storage control unit 116" is a function pertaining to the third embodiment, which will be described later.

Measurement unit 111 measures the orientation or displacement of communication terminal device 10 on the basis of the acceleration measured by accelerometer 16 and the angular velocity measured by gyrosensor 17.

Proximity detection unit 112 detects when the user's head area is near communication terminal device 10 on the basis of a detection result from proximity sensor 18. In the present embodiment, proximity detection unit 112 detects that the user's head area is near communication terminal device 10 in response to proximity sensor 18 having detected an object being near.

Operation detection unit 113 detects a predetermined operation being made by the user using communication terminal device 10. This operation does not include an operation of an operating unit realized by hardware or software (for example, touch screen unit 12 being operated). In the present embodiment, operation detection unit 113 detects voice from the user being inputted into microphone 14, or in other words, detects that an utterance from the user.

Voice call control unit 114 carries out control pertaining to voice calls. Voice call control unit 114 includes answering unit 114A and hold/hangup control unit 114B.

Answering unit 114A carries out control pertaining to the automatic response function. Answering unit 114A responds to an incoming voice call. Answering unit 114A responds to the incoming call in the case where, after the orientation or displacement measured by measurement unit 111 meets a predetermined condition, the user's head area is detected as being near by proximity detection unit 112, and furthermore, a user operation is detected by operation detection unit 113 during the detection of the head area as being near (in other words, while the head area being detected as near). Answering unit 114A establishes a communication path for the voice call via wireless communication unit 13 in the case of responding to the incoming call.

Here, the condition of the orientation or displacement refers to at least an acceleration or an angular velocity being produced. The condition of the orientation or the displacement includes the orientation of communication terminal device 10 changing over time, for example.

Hold/hangup control unit 114B carries out control pertaining to the hold/hangup function. Hold/hangup control unit 114B is an example of a hangup control unit according to the present invention. After a voice call has been started by answering unit 114A responding, hold/hangup control unit 114B places the voice call into an on-hold state, terminates the voice call (in other words, hangs up), or the like in accordance with the orientation measured by measurement unit 111. The on-hold state is a state in which control for sending and receiving voice is suspended with the communication path for the voice call remaining established. Terminating the voice call refers to cutting off the voice call communication path that has been established.

Notification processing unit 115 carries out notification processing for making a notification that answering unit 114A has responded to an incoming call. Notification processing unit 115 outputs predetermined audio (a notification sound) via speaker 15 in the case where answering unit 114A has responded to an incoming call. Notification processing unit 115 need not carry out this notification processing in the case where the automatic response function is not used and a response has been instructed by the user operating the operating unit.

Operations of communication terminal device 10 pertaining to the automatic response function and the hold/hangup function will be described next.

A: Automatic Response Function

Figure 4:
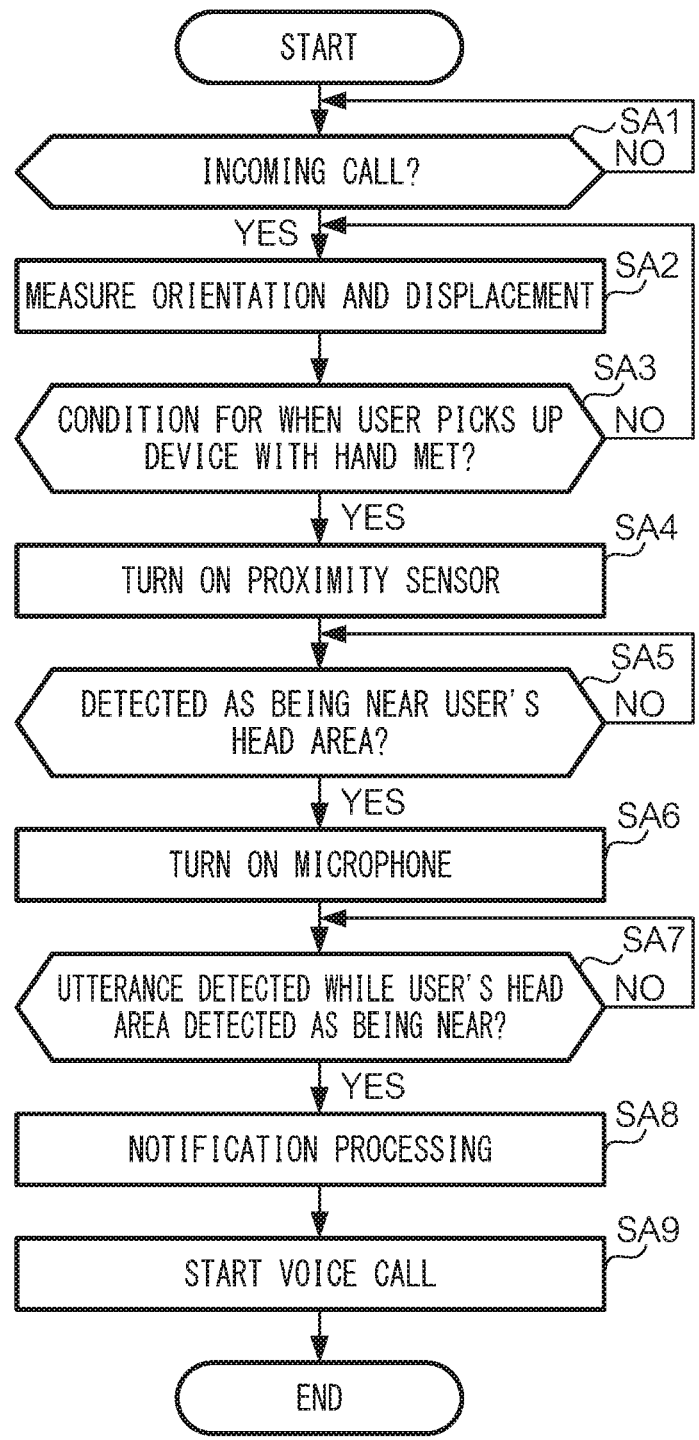
FIG. 4 is a flowchart illustrating processing pertaining to an automatic response function executed by the communication terminal device according to the same embodiment.
Figure 5:
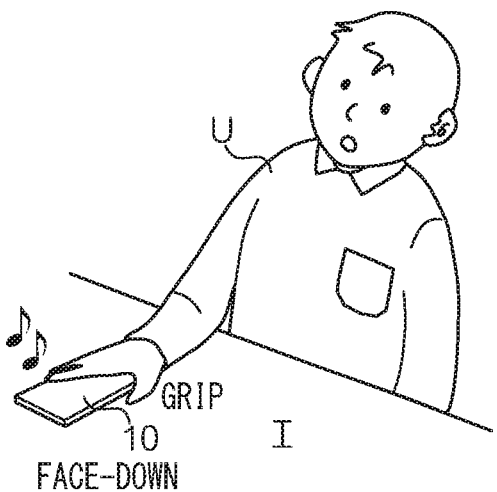
FIG. 5 is a descriptive diagram illustrating an example of states of a communication terminal device and a user when a voice call is incoming.
Figure 5:
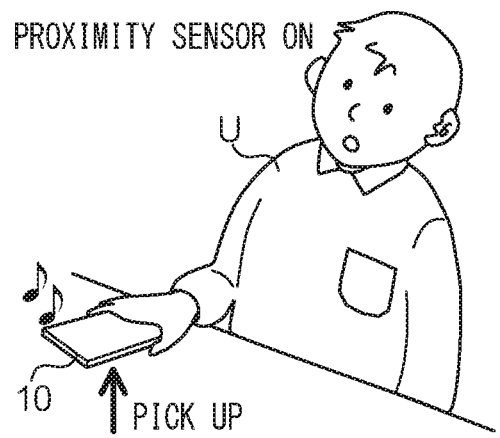
Figure 5:
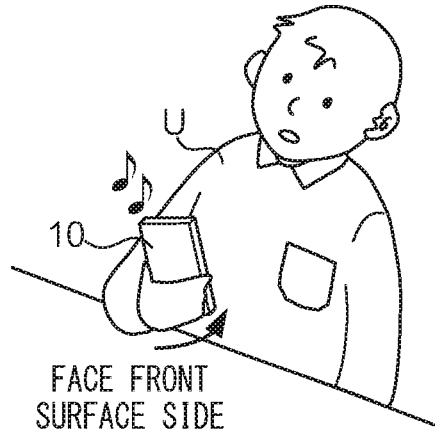
Figure 5:
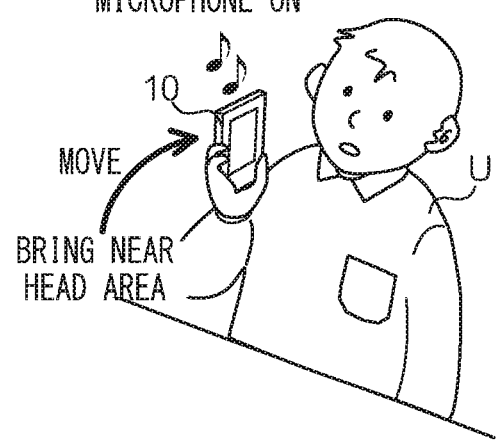
Figure 5:
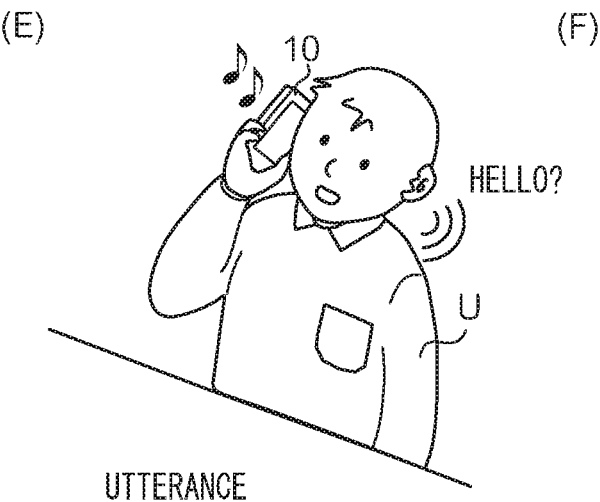
Figure 5:

FIG. 4 is a flowchart illustrating processing pertaining to the automatic response function executed by communication terminal device 10. FIG. 5 is a descriptive diagram illustrating an example of states of communication terminal device 10 and the user when a voice call is incoming.

Control unit 11 of communication terminal device 10 repeatedly determines whether or not a voice call is incoming while communication terminal device 10 is turned on (step SA1). At this time, control unit 11 turns microphone 14 off and does not convert inputted voice into a voice signal. Control unit 11 also turns proximity sensor 18 off and does not detect whether or not an object is near.

In the case where it is determined that there is an incoming voice call (step SA1; YES), control unit 11 measures the orientation and displacement of communication terminal device 10 using accelerometer 16 and gyrosensor 17 (step SA2).

Note that control unit 11 outputs a ringtone via speaker 15 while the incoming voice call is being received. Control unit 11 may cause communication terminal device 10 to vibrate on the basis of a vibration function instead of or in addition to the ringtone.

Next, control unit 11 determines whether or not the measured orientation and displacement meet a condition established when the user picks up communication terminal device 10 with his/her hand (step SA3). Here, control unit 11 determines that communication terminal device 10 has been picked up by the user's hand in the case where the orientation of communication terminal device 10 has changed over time or communication terminal device 10 has displaced.

Here, consider a case where there is an incoming voice call while communication terminal device 10 is placed faced-down on a horizontal table T, as illustrated in FIG. 5(A). In this case, user U who will take the voice call first grips communication terminal device 10 from a rear surface side thereof using his/her hand. Next, as illustrated in FIG. 5(B), user U picks up communication terminal device 10 that s/he is gripping. Then, as illustrated in FIG. 5(C), user U turns the front surface side of communication terminal device 10 toward him/herself. In this manner, an acceleration or angular velocity acts on communication terminal device 10 when communication terminal device 10 is held in the user's hand, which causes the orientation of communication terminal device 10 to change over time, causes communication terminal device 10 to displace, and so on.

Note that the condition established when the user picks up communication terminal device 10 with his/her hand is not limited to this example. The condition may, for example, be that the orientation of communication terminal device 10 at a single point in time is a predetermined orientation (for example, an upright or nearly upright orientation). When in the upright orientation, a front surface of communication terminal device 10 is parallel or substantially parallel to a vertical direction.

Control unit 11 repeatedly measures the orientation and displacement of communication terminal device 10 until it is determined that the user has picked up communication terminal device 10 with his/her hand (step SA3; NO). In the case of a determination of "YES" in step SA3, control unit 11 turns proximity sensor 18 on and starts detecting whether or not an object is near (step SA4).

Next, control unit 11 determines whether or not proximity sensor 18 has detected that the user's head area is near (step SA5). In the case where control unit 11 does not detect the user's head area as being near (step SA5; NO), the detection performed by proximity sensor 18 is repeated.

For example, after turning the front surface side of communication terminal device 10 toward him/herself (FIG. 5(C)), user U moves communication terminal device 10 toward his/her own head area, as illustrated in FIG. 5(D). Upon the state illustrated in FIG. 5(D) being established, control unit 11 determines that the user's head area has been detected as being near by proximity sensor 18 (step SA5; YES).

Next, control unit 11 turns microphone 14 on and starts detecting whether or not the user has made an utterance (step SA6). Control unit 11 detects whether or not the user has made an utterance on the basis of a voice signal supplied from microphone 14. Next, control unit 11 determines whether or not an utterance from the user has been detected while the user's head area is being detected as near by proximity sensor 18 (step SA7).

Control unit 11 detects an utterance from the user on the basis of, for example, the level of a frequency band corresponding to a human voice. Here, control unit 11 may detect an utterance from the user using a known voice recognition technique, a known voiceprint analysis technique, or the like.

In the case where an utterance from the user is not detected while the user's head area is detected as being near, or in the case where the user's head area is not detected as being near when an utterance from the user is detected (step SA7; NO), control unit 11 stands by as-is.

Here, assume that user U has uttered the word "hello?", as indicated in FIG. 5(E). This utterance is a typical utterance made when a user first starts a voice call.

In the case where an utterance from the user is detected and a determination of "YES" is made in step SA7, control unit 11 carries out the notification processing (step SA8). Control unit 11 outputs the notification sound via speaker 15. Having heard this notification sound, the user can understand that the incoming call will be responded to by the automatic response function.

Note that control unit 11 may output the same notification sound regardless of the voice call partner, or may vary the notification sound depending on the voice call partner.

After the notification processing, control unit 11 responds to the incoming call and starts the voice call (step SA9). Thereafter, control unit 11 carries out control for voice calls. As illustrated in FIG. 5(F), user U carries out the voice call with communication terminal device 10 near his/her ear.

Note that in the case where the incoming voice call is no longer being received, control unit 11 ends the processing pertaining to the automatic response function described with reference to FIG. 4. Along with ending the processing, control unit 11 turns microphone 14 and proximity sensor 18 off.

Through the automatic response function described above, communication terminal device 10 can detect a very natural operation when the user picks up communication terminal device 10 with his/her hand and takes a voice call, and then start the voice call, without the user operating the operating unit. Additionally, even in the case where the user is unaccustomed to operating touch screen unit 12, the user will feel little burden with respect to operations for starting voice calls.

Furthermore, communication terminal device 10 responds to an incoming call under the condition that, after it is determined that the user has picked up communication terminal device 10 with his/her hand, the user's head area is detected as being near and a utterance from the user is detected while the user's head area is detected as being near. This utterance is an operation carried out when communication terminal device 10 is brought near to the user's head area and is in a state where a voice call can be carried out. This utterance is an operation that is unlikely to be carried out when the user is not in a state where a voice call can be carried out, such as when communication terminal device 10 is inside a purse or immediately after the user has picked up communication terminal device 10 with his/her hand, for example. Thus according to communication terminal device 10, it is easy to respond when the user is in a state where a voice call can be carried out. To rephrase, communication terminal device 10 is unlikely to respond at the wrong time using the automatic response function.

B: Hold/Hangup Function

Figure 6:
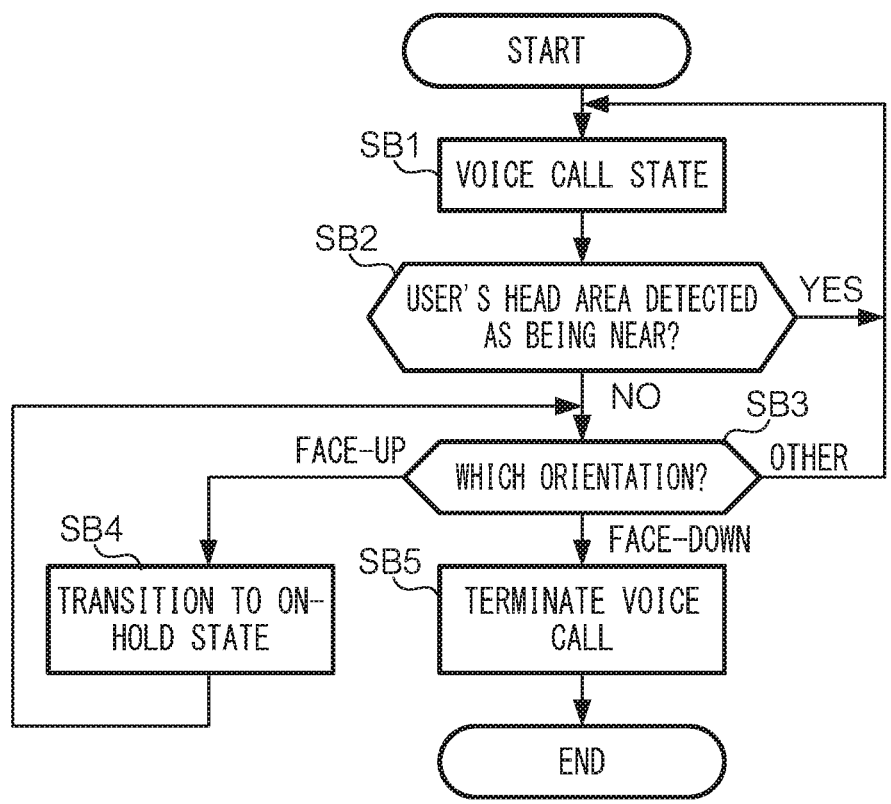
FIG. 6 is a flowchart illustrating processing pertaining to a hold/hangup function executed by the communication terminal device according to the same embodiment.
Figure 7:
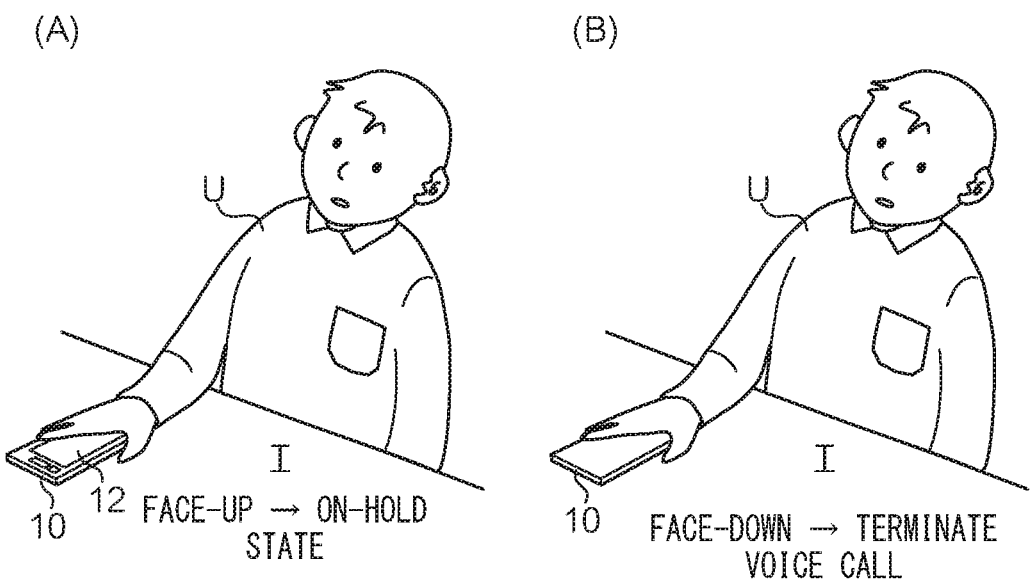
FIG. 7 is a descriptive diagram illustrating an example of states of a communication terminal device and a user during a voice call.

FIG. 6 is a flowchart illustrating processing pertaining to the hold/hangup function executed by communication terminal device 10. FIG. 7 is a descriptive diagram illustrating an example of states of communication terminal device 10 and the user during a voice call. During a voice call, control unit 11 repeatedly measures the orientation and displacement of communication terminal device 10 using accelerometer 16 and gyrosensor 17, and repeatedly detects whether the user's head area is near using proximity sensor 18.

During a voice call state, in which communication for a voice call is in progress (step SB1), control unit 11 determines whether or not the user's head is being detected as near by proximity sensor 18 (step SB2). In the case of a determination of "YES" in step SB2, it is assumed that a voice call is in progress. As such, control unit 11 returns to step SB1 and maintains the voice call state.

In the case where it is determined that the user's head area is no longer detected as being near (step SB2; NO), control unit 11 determines the orientation of communication terminal device 10 at that point in time (step SB3). Here, control unit 11 determines whether the orientation of communication terminal device 10 is "face-up", "face-down", or "other", which is neither face-up nor face-down. "Face-up" and "face-down" are orientations in which display region 121A of communication terminal device 10 is horizontal or nearly horizontal, but in which display region 121A faces different directions. For example, in the case where a normal direction of display region 121A has vertical-upward directional components and an angle formed by these components is less than a predetermined angle, communication terminal device 10 is face-up. In the case where the normal direction of display region 121A has vertical-downward directional components and an angle formed by these components is less than a predetermined angle, communication terminal device 10 is face-down.

In the case where it is determined that communication terminal device 10 is in the other orientation (step SB3; OTHER), control unit 11 returns to step SB1 and maintains the voice call state.

In the case where it is determined that communication terminal device 10 is face-up (step SB3; FACE-UP), control unit 11 transitions from the voice call state to the on-hold state (step SB4). For example, in the case where user U has placed communication terminal device 10 face-up on table T as illustrated in FIG. 7(A), the user can see display region 121A, and it is thus possible that the voice call has only been temporarily suspended. As such, control unit 11 transitions from the voice call state to the on-hold state. Control unit 11 then returns the processing to step SB3. In the case where it is then determined that the orientation is the other orientation (step SB3; OTHER), control unit 11 transitions from the on-hold state to the voice call state. Here, control unit 11 may use the user's head area detected as being near by proximity sensor 18 as a condition for transitioning to the voice call state.

In the case where it is determined that communication terminal device 10 is face-down (step SB3; FACE-DOWN), control unit 11 terminates the voice call (step SB5). For example, in the case where user U has placed communication terminal device 10 face-down on table T as illustrated in FIG. 7(B), the user cannot see display region 121A, and it is thus assumed that user U has terminated the voice call. Accordingly, control unit 11 terminates the voice call. After terminating the voice call, control unit 11 turns microphone 14 and proximity sensor 18 off.

Through the hold/hangup function described above, communication terminal device 10 can detect a very natural operation when the user picks up communication terminal device 10 with his/her hand and takes a voice call, and control the state of the voice call, without the user operating the operating unit. Furthermore, communication terminal device 10 does not transition to the on-hold state or terminate the voice call while the user's head area is detected as being near, and thus it is unlikely that these processes will be carried out at the wrong time.

Second Embodiment

As illustrated in FIG. 5(E), user U makes an utterance for a response to be made using the automatic response function. However, the voice call has not yet been started at this point in time, and thus the content of this utterance will not be sent to the voice call partner. As such, with communication terminal device 10 according to the above-described first embodiment, it is necessary for the user to make one utterance for a response to be made using the automatic response function and another utterance to let the voice call partner know that the voice call can be carried out. As opposed to this, communication terminal device 10 according to the present embodiment has a function for sending voice expressed by utterance data UD after a response is made using the automatic response function.

In the present embodiment, elements having the same reference numerals as those in the above-described first embodiment have equivalent functions as those in the above-described first embodiment. The hardware configuration and functional configuration of communication terminal device 10 according to the present embodiment is for the most part the same as in the above-described first embodiment. However, control unit 11 of communication terminal device 10 implements a function corresponding to voice transmission control unit 114C. Voice transmission control unit 114C carries out control for sending the voice expressed by the stored utterance data UD via wireless communication unit 13 in the case where a voice call has been started by a response made by answering unit 114A.

Utterance data UD indicated in FIG. 2 is voice data expressing voice inputted by the user in advance. Utterance data UD expresses an initial utterance made by the user when starting a voice call, such as "hello?" and "this is ○○" (where ○○ is the user's name, for example). Utterance data UD may be stored at any desired time aside from during a voice call, for example.

Figure 8:
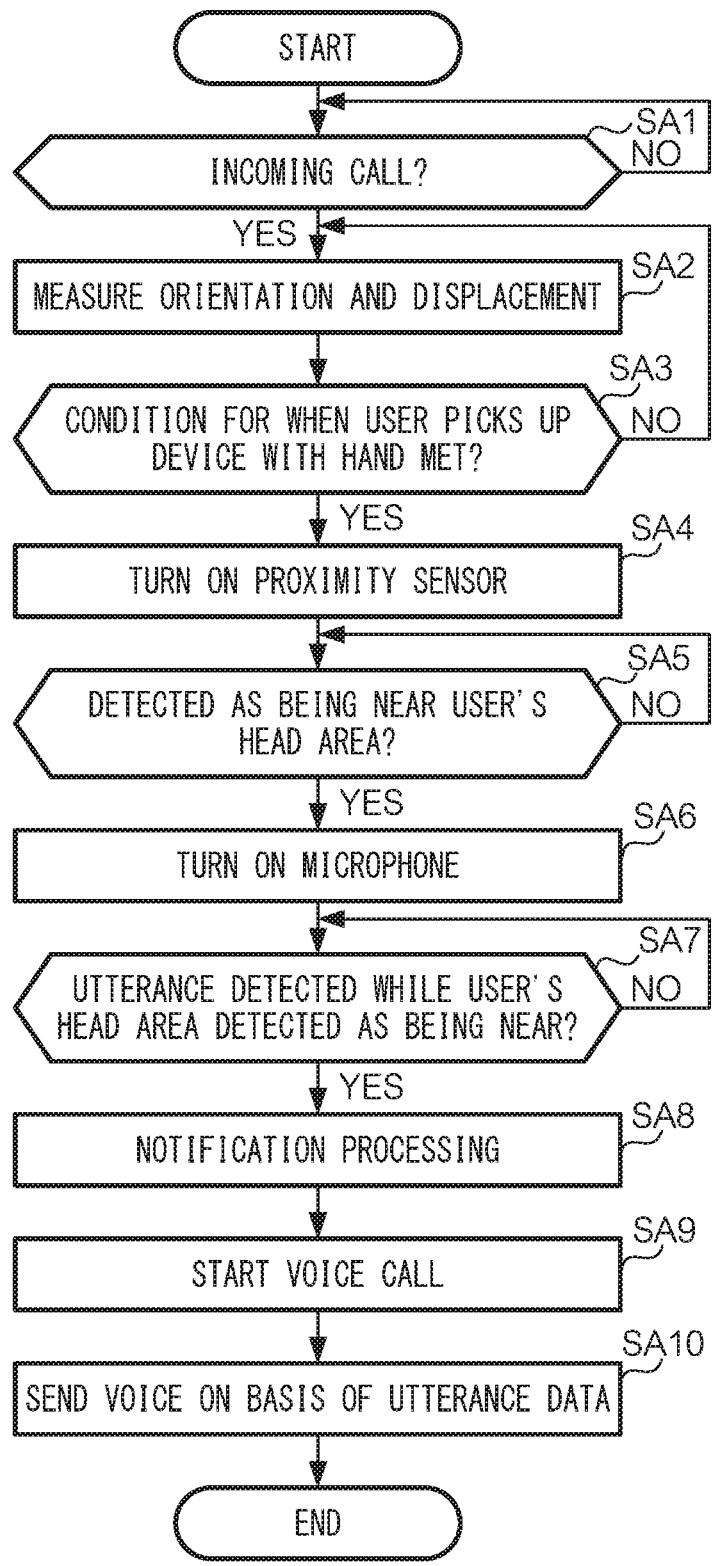
FIG. 8 is a flowchart illustrating processing pertaining to an automatic response function executed by a communication terminal device according to a second embodiment of the present invention.

FIG. 8 is a flowchart illustrating processing pertaining to the automatic response function executed by communication terminal device 10. In the case where a voice call has been started by executing the processing steps of steps SA1 to SA9, control unit 11 of communication terminal device 10 carries out control for sending the voice expressed by utterance data UD (step SA10). In step SA10, control unit 11 generates a voice signal expressing the voice to be sent on the basis of utterance data UD and sends that signal to the telephone line via wireless communication unit 13. A telephone of the voice call partner outputs the voice expressed by the voice signal after the voice call is started.

According to communication terminal device 10 of the present embodiment, it is not necessary for the user to make one utterance for the response made by the automatic response function and another utterance to let the voice call partner know that the voice call can be carried out.

Third Embodiment

Like the above-described second embodiment, communication terminal device 10 according to the present embodiment carries out control for sending voice expressed by utterance data UD after a response is made using the automatic response function. However, communication terminal device 10 according to the present embodiment differs from the above-described second embodiment in that the user's utterance for making a response using the automatic response function is sent to the voice call partner.

In the present embodiment, elements having the same reference numerals as those in the above-described first embodiment have equivalent functions as those in the above-described first embodiment. The hardware configuration and functional configuration of communication terminal device 10 according to the present embodiment is for the most part the same as in the above-described first embodiment. However, control unit 11 of communication terminal device 10 implements a function corresponding to storage control unit 116.

When the input of the user's voice is detected by operation detection unit 113, storage control unit 116 generates utterance data UD expressing the inputted voice and stores that data in storage unit 19.

Figure 9:
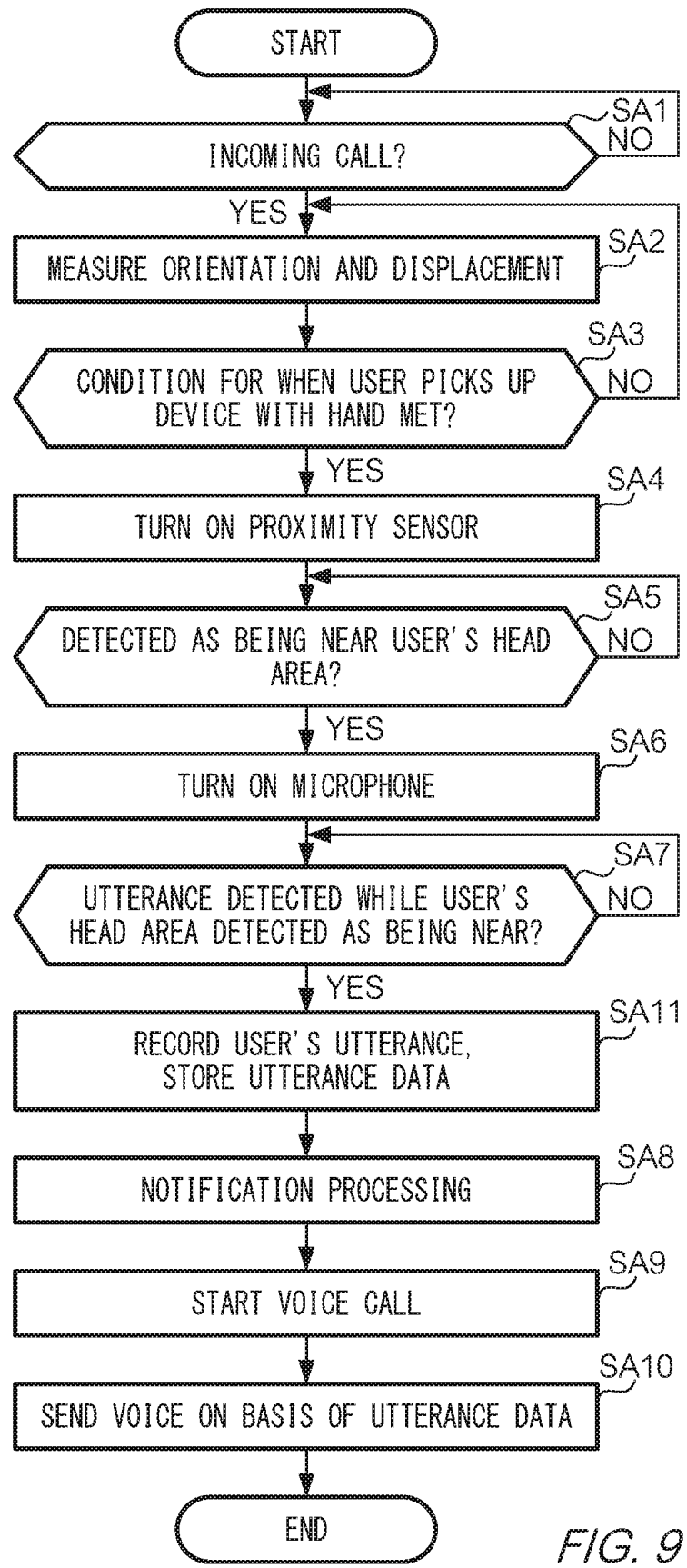
FIG. 9 is a flowchart illustrating processing pertaining to an automatic response function executed by a communication terminal device according to a third embodiment of the present invention.

FIG. 9 is a flowchart illustrating processing pertaining to the automatic response function executed by communication terminal device 10. After the processing steps of steps SA1 to SA6 are executed, control unit 11 of communication terminal device 10 determines whether or not an utterance from the user has been detected while the user's head area is being detected as near by proximity sensor 18 (step SA7). In the case where the utterance is detected, control unit 11 records the user's utterance and causes utterance data UD to be stored in storage unit 19 (step SA7; YES→step SA11). Utterance data UD expresses the word "hello?", as indicated in FIG. 5E, for example.

Then, after a voice call has been started in step SA9, control unit 11 carries out control for sending the voice expressed by utterance data UD (step SA10).

In this manner, communication terminal device 10 records the utterance made by the user for making the response using the automatic response function and sends that utterance to the voice call partner, and thus utterance data UD need not be stored in storage unit 19 in advance. Additionally, the first utterance made by the user may have different content or a different tone of voice depending on the voice call partner, the user's mood at that time, and so on, but communication terminal device 10 according to the present embodiment can send the utterance made by the user for that voice call to the partner.

Fourth Embodiment

With the hold/hangup function according to the above-described first embodiment, the voice call is terminated in the case where communication terminal device 10 is placed face-down. However, in the case where, for example, the user takes communication terminal device 10 out from his/her pocket for a voice call, it is likely that s/he will return communication terminal device 10 to the same pocket after the voice call is finished. Communication terminal device 10 is often in an upright or nearly upright orientation when stored in a pocket. In this case, it is possible that the voice call will not be terminated even if the user stores communication terminal device 10 in his/her pocket in an attempt to terminate the voice call.

Accordingly, communication terminal device 10 of the present embodiment specifies an orientation as a condition for terminating a voice call in accordance with an orientation at the time of an incoming call.

In the present embodiment, elements having the same reference numerals as those in the above-described first embodiment have equivalent functions as those in the above-described first embodiment. The hardware configuration and functional configuration of communication terminal device 10 according to the present embodiment is for the most part the same as in the above-described first embodiment. However, hold/hangup control unit 114B functions as a hangup control unit that, in the case where a voice call has been started by a response made by answering unit 114A and an orientation occurring when the incoming call was received has been measured, terminates that voice call.

A: Automatic Response Function

Figure 10:
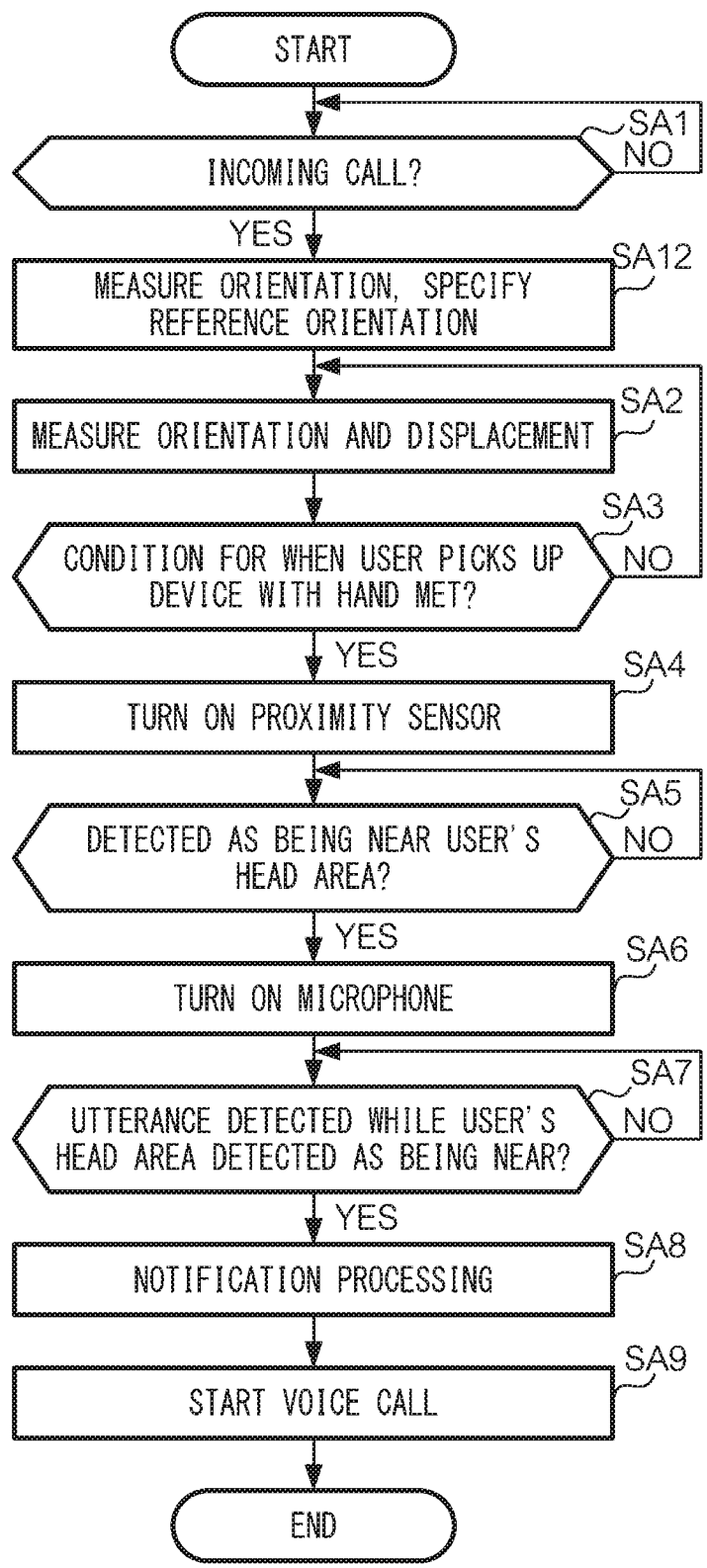
FIG. 10 is a flowchart illustrating processing executed by a communication terminal device according to a fourth embodiment of the present invention when a voice call is incoming.
Figure 11:
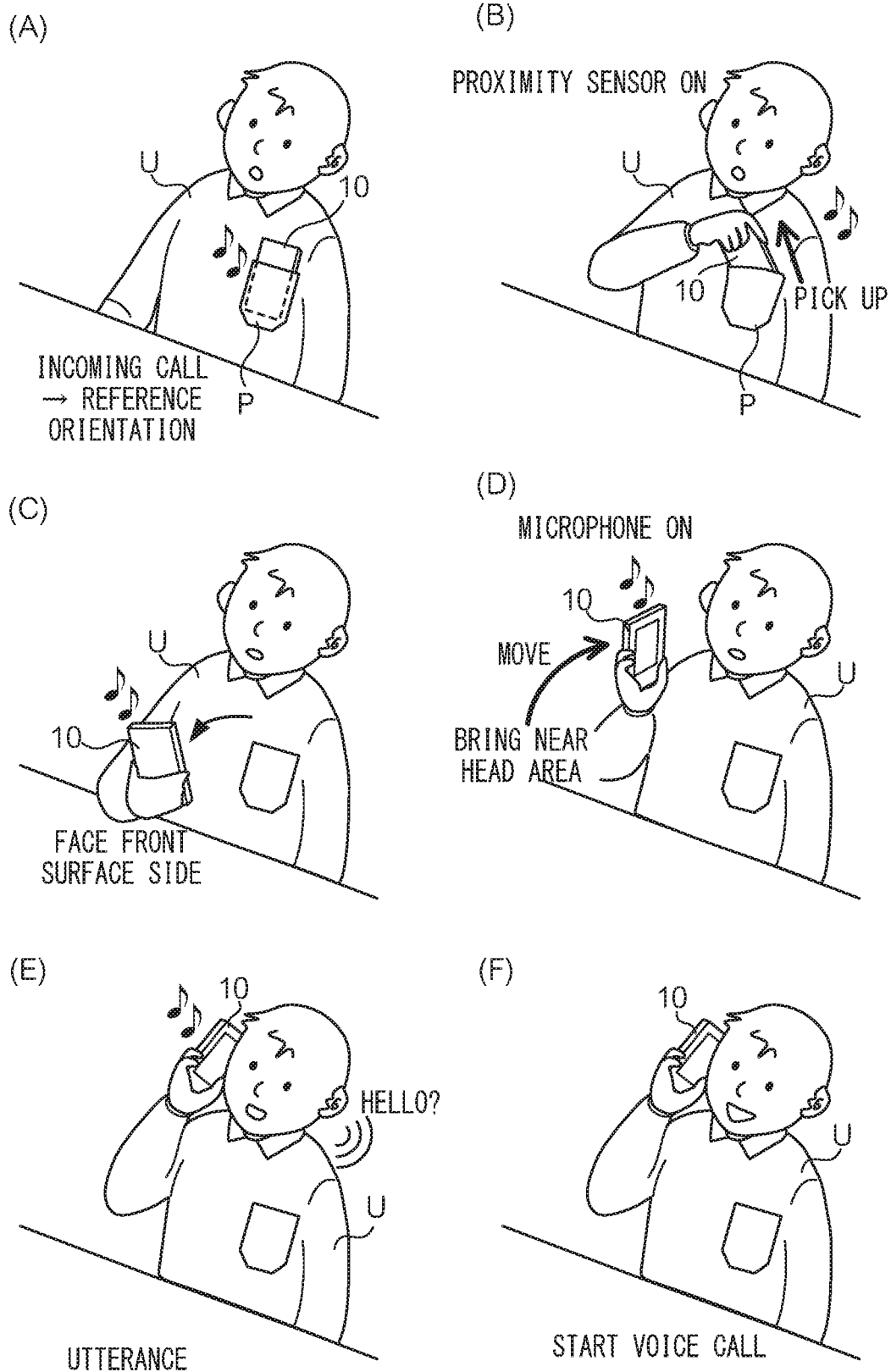
FIG. 11 is a descriptive diagram illustrating an example of states of a communication terminal device and a user when a voice call is incoming.

FIG. 10 is a flowchart illustrating processing pertaining to the automatic response function executed by communication terminal device 10. FIG. 11 is a descriptive diagram illustrating an example of states of communication terminal device 10 and the user at the time of an incoming call.

When a determination of "YES" is made in step SA1, control unit 11 of communication terminal device 10 measures the orientation of communication terminal device 10 and specifies the measured orientation as a reference orientation (step SA12). Here, control unit 11 specifies the orientation occurring at the time of the incoming call, and more specifically, an initial orientation at the time when the incoming call was received, as the reference orientation. Control unit 11 causes orientation data expressing the reference orientation to be stored in storage unit 19.

For example, in the case where communication terminal device 10 is stored in chest pocket P of user U as illustrated in FIG. 11(A), control unit 11 specifies the orientation of communication terminal device 10 illustrated in FIG. 11(A) as the reference orientation. Then, when it is determined that user U has picked up communication terminal device 10 with his/her hand on the basis of the measured orientation or displacement as illustrated in FIG. 11(B), control unit 11 makes a determination of "YES" in step SA3. Control unit 11 then executes the processing steps of steps SA4 to SA9 and starts the voice call. The states illustrated in FIGS. 11(C) to (F) are the same as the states in FIGS. 5(C) to (F), respectively, and thus descriptions thereof will be omitted.

B: Hangup Function

Figure 12:
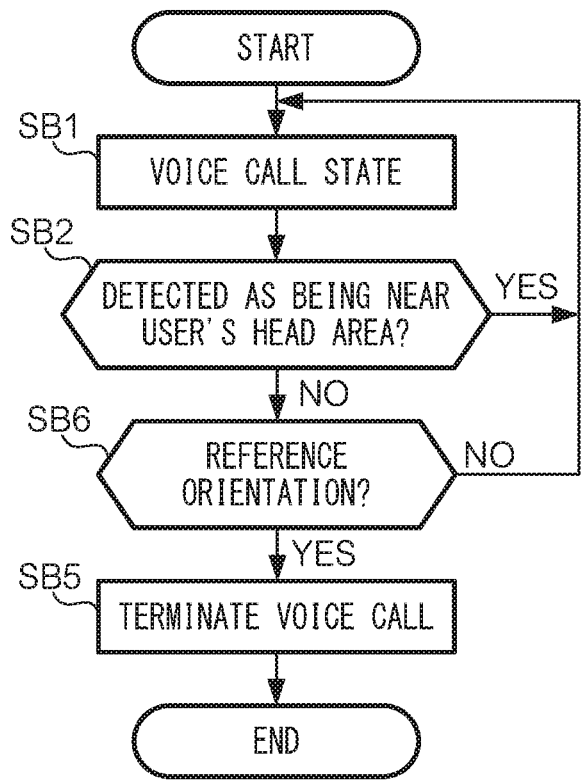
FIG. 12 is a flowchart illustrating processing pertaining to a hangup function executed by the communication terminal device according to the same embodiment.
Figure 13:
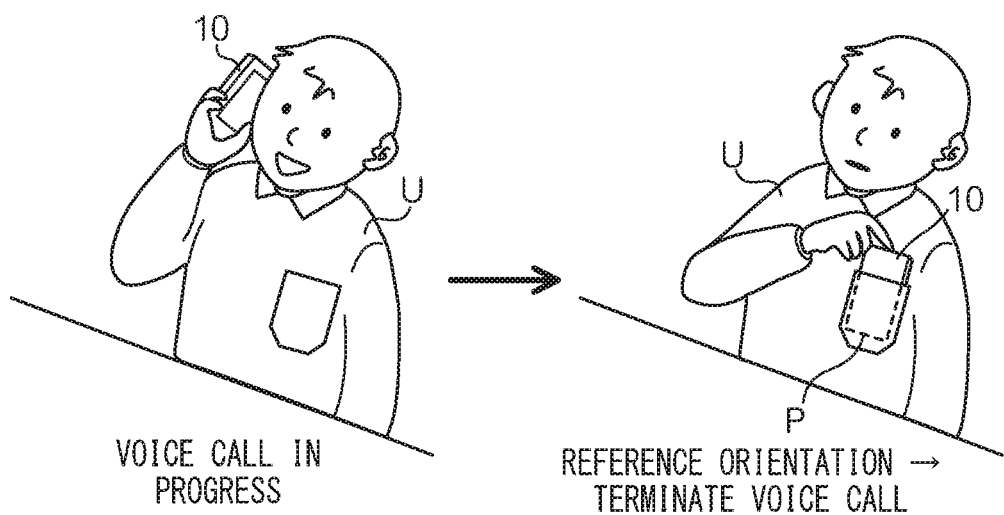
FIG. 13 is a descriptive diagram illustrating an example of states of a communication terminal device and a user during a voice call.
Figure 14:
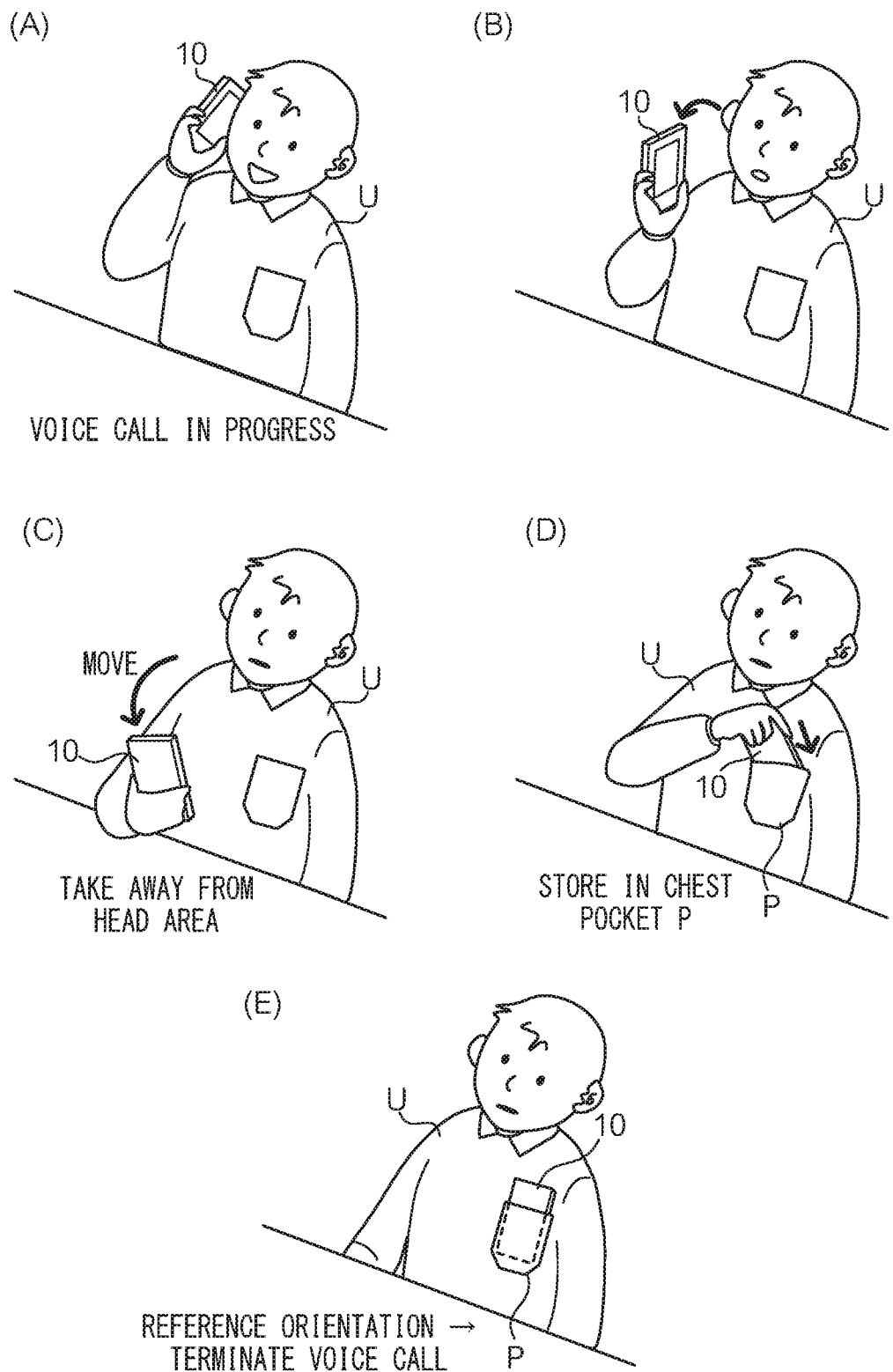
FIG. 14 is a descriptive diagram illustrating an example of states of a communication terminal device and a user during a voice call.

FIG. 12 is a flowchart illustrating processing pertaining to the hangup function executed by communication terminal device 10. FIG. 13 is a descriptive diagram illustrating an example of states of communication terminal device 10 and the user during a voice call.

During a voice call state (step SB1), control unit 11 determines whether or not the user's head area is being detected as near by proximity sensor 18 (step SB2). In the case of a determination of "YES" in step SB2, it is assumed that user U is making a voice call using communication terminal device 10, as illustrated in FIG. 13(A). As such, control unit 11 returns to step SB1 and maintains the voice call state.

In the case where it is determined that the user's head area is no longer being detected as near by proximity sensor 18 (step SB2; NO), control unit 11 determines whether or not the orientation of communication terminal device 10 at that point in time is the reference orientation indicated by the orientation data stored in storage unit 19 (step SB6). Here, in the case where it is determined that the orientation is not the reference orientation (step SB6; NO), control unit 11 returns to step SB1 and maintains the voice call state.

Then, in the case where it is determined that the orientation of communication terminal device 10 at that point in time is the reference orientation indicated by the orientation data stored in storage unit 19 (step SB6; YES), control unit 11 terminates the voice call (step SB5). When user U stores communication terminal device 10 in chest pocket P in an attempt to terminate the voice call as illustrated in FIG. 13(B), communication terminal device 10 will likely be in the same (or substantially the same) orientation as when the incoming call was received. Accordingly, control unit 11 terminates the voice call.

According to communication terminal device 10 of the present embodiment, control for terminating the voice call can be carried out regardless of the orientation of communication terminal device 10 when the incoming call was received.

Although the present embodiment describes a case where communication terminal device 10 is stored in chest pocket P, the same effects can be achieved even in cases where communication terminal device 10 is stored in another location, in another orientation, and so on.

C: Variation on Hangup Function

Rather than specifying the orientation at the single point in time when an incoming call is received as the reference orientation, control unit 11 of communication terminal device 10 may specify a change in the orientation over time when an incoming call is received as the reference orientation. In this case, control unit 11 specifies the reference orientation on the basis of, for example, a change in communication terminal device 10 over time as illustrated in FIGS. 11(A) to 11(F). In the case where a change in the orientation over time measured after the voice call is started corresponds to the reverse of a change in the orientation over time when the incoming call was received, control unit 11 terminates the voice call. Here, control unit 11 terminates the voice call in the case where the reverse of the change over time in communication terminal device 10 illustrated in FIGS. 11(A) to 11(E), or in other words, a change over time in the orientation illustrated in FIGS. 14(A) to (E), has been measured.

In this variation, control unit 11 may use the displacement of communication terminal device 10 instead of or in combination with the change over time in the orientation of communication terminal device 10. In this case, control unit 11 terminates the voice call in the case where the displacement of communication terminal device 10 is the reverse of the displacement of the orientation measured when the incoming call was received.

It is assumed that after a making a voice call using communication terminal device 10, the user will often return communication terminal device 10 to its original state through the reverse movement as that made when the incoming call was received. Thus according to communication terminal device 10 of the present variation, control for terminating the voice call can be carried out regardless of the orientation of communication terminal device 10 when the incoming call was received.

Fifth Embodiment

Communication terminal device 10 may implement the hangup function described hereinafter.

Figure 15:
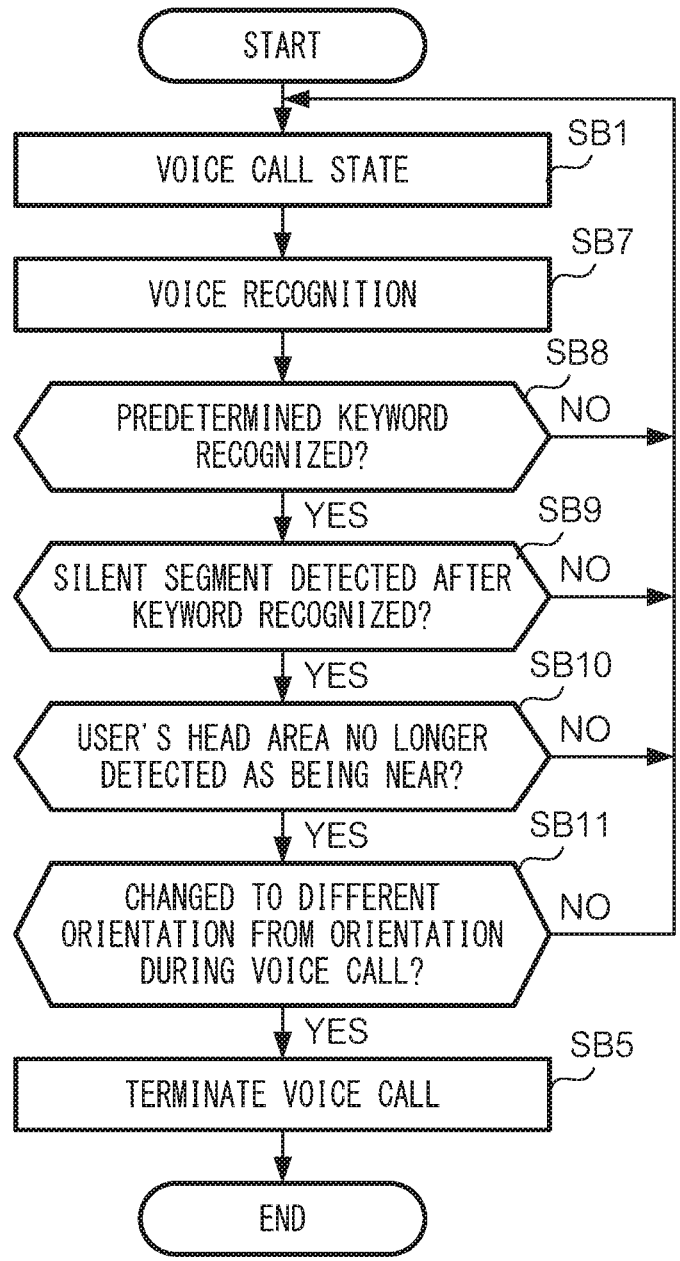
FIG. 15 is a flowchart illustrating processing pertaining to a hangup function executed by a communication terminal device according to a fifth embodiment of the present invention.
Figure 16:
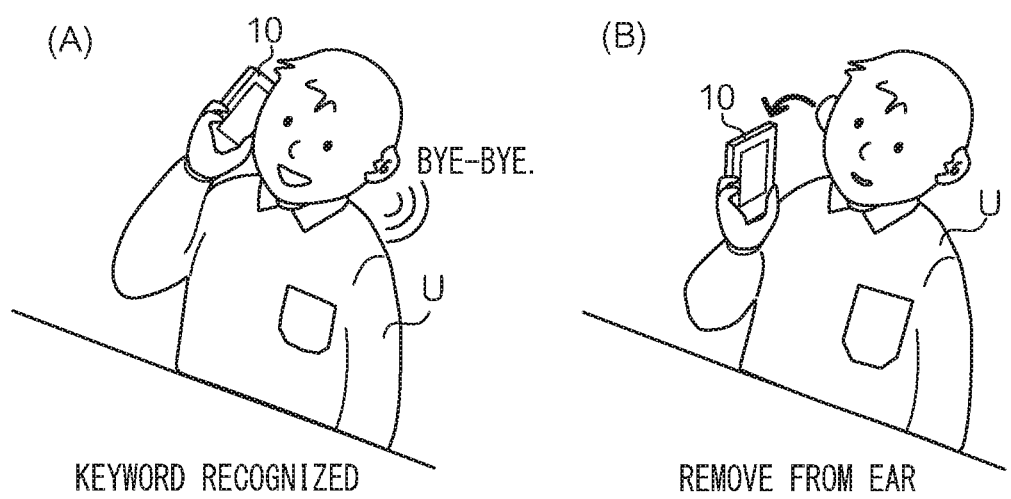
FIG. 16 is a descriptive diagram illustrating an example of states of a communication terminal device and a user during a voice call.

FIG. 15 is a flowchart illustrating processing pertaining to the hangup function executed by communication terminal device 10 according to the present embodiment. FIG. 16 is a descriptive diagram illustrating an example of states of communication terminal device 10 and the user during a voice call.

During the voice call state (step SB1), control unit 11 carries out voice recognition on the basis of the voice signal expressing the voice inputted by the user, supplied from microphone 14 (step SB7). Then, control unit 11 determines whether or not a predetermined keyword has been recognized on the basis of a result of the voice recognition (step SB8). Step SB8 is a step of determining whether or not a word uttered when the user intends to terminate a voice call has been recognized. FIG. 16(A) illustrates a case where user U utters "bye-bye" before terminating a voice call. Although the keyword used in the determination of step SB8 is described as being "bye-bye", for example, any words uttered by a speaker when terminating a voice call, such as "I'm going to go now", may be used.

Note that the keyword used in the determination of step SB9 need not be a single word, and may instead be a plurality of words. Additionally, the keyword may be a keyword determined at the design stage or the like of communication terminal device 10, or may be a keyword registered by the user.

In the case where it is determined that the predetermined keyword has not been recognized (step SB8; NO), control unit 11 returns to step SB1 and maintains the voice call state. On the other hand, in the case where it is determined that the predetermined keyword has been recognized (step SB8; YES), control unit 11 determines whether or not a silent segment has been detected after the recognition of the keyword, on the basis of the voice signal supplied from microphone 14 (step SB9). The silent segment is a segment of silence resulting from the user not making any utterance. The silent segment is a segment in which, for example, the level of voice in a voice band is less than or equal to a predetermined level. The user normally does not utter any words after uttering the words used when terminating a voice call, and thus the silent segment is present.

Note that the length of the silent segment used as the condition for a determination of "YES" in step SB9 may be determined in advance (three seconds, for example).

In the case where it is determined that the silent segment has not been detected (step SB9; NO), control unit 11 returns to step SB1 and maintains the voice call state. However, in the case where it is determined that the silent segment has been detected (step SB9; YES), control unit 11 determines whether or not the user's head area is no longer detected as being near by proximity sensor 18 (step SB10). In the case where it is determined that the user's head area is detected as being near (step SB10; NO), control unit 11 returns to step SB1 and maintains the voice call state.

However, in the case where it is determined that the user's head area is no longer detected as being near by proximity sensor 18 (step SB10; YES), control unit 11 determines whether or not the orientation has changed to an orientation different from the orientation occurring during the voice call (step SB11). For example, control unit 11 determines whether or not the orientation last measured when the user's head area was near is different from the first orientation measured upon the user's head area no longer being detected as near. In the case of a determination of "NO" in step SB11, control unit 11 returns to step SB1 and maintains the voice call state.

In the case of a determination of "YES" in step SB11, control unit 11 terminates the voice call (step SB5). When terminating a voice call, user U takes communication terminal device 10 away from his/her own ear (head area), as illustrated in FIG. 16(B). Furthermore, the orientation of communication terminal device 10 changes in response to this operation.

According to communication terminal device 10 of the present embodiment, a voice call can be terminated at a timing matching the user's intentions even without the user carrying out an operation for instructing the voice call to be terminated.

Note that the processing of step SB11 may be omitted. Proximity sensor 18 changes from a state of detecting the user's head area as being near to a state of not detecting the user's head area as being near due at least to the orientation of communication terminal device 10 changing. Additionally, the processing of step SB9 may be omitted. Furthermore, the voice recognition and silent segment detection may be carried out by an external device such as a server device connected over a network rather than being carried out by control unit 11 (operation detection unit 113, for example).

Variations

The present invention can be carried out in other forms aside from those in the above-described embodiments. The present invention can also be carried out in the following forms, for example. The variations described hereinafter may also be combined as appropriate.

Variation 1

Communication terminal device 10 may have a configuration realized by combining the configurations according to two or more of the above-described first to fifth embodiments.

Variation 2

Communication terminal device 10 may make a response using the automatic response function under the condition that an operation aside from an utterance from the user is detected.

For example, the operation carried out by the user using communication terminal device 10 may be an operation of the user applying an external force on communication terminal device 10. For example, control unit 11 may make the response in the case where an operation of striking communication terminal device 10 (the rear surface side thereof, for example) is detected using accelerometer 16 while the user's head area is detected as being near. Additionally, control unit 11 may make the response in the case where an operation of shaking communication terminal device 10 is detected using accelerometer 16 while the user's head area is detected as being near.

In this manner, communication terminal device 10 may make a response using the automatic response function in the case where an operation that is carried out in a state where the user can make a voice call and is an operation aside from the operating unit being operated is detected.

Variation 3

Configurations and operations described in the above embodiments may be partially omitted.

Communication terminal device 10 may implement the automatic response function, the hold/hangup function, and so on the basis of the orientation or displacement of communication terminal device 10 itself. In this case, measurement unit 111 measures the orientation or the displacement of communication terminal device 10. In other words, communication terminal device 10 may implement the automatic response function, the hold/hangup function, or the like on the basis of at least one of the orientation and the displacement of communication terminal device 10 itself.

Communication terminal device 10 need not carry out the notification processing when a response to an incoming call is made.

Communication terminal device 10 need not have one or both of the hold/hangup functions.

Communication terminal device 10 may cause microphone 14, accelerometer 16, gyrosensor 17, and proximity sensor 18 to operate continuously while communication terminal device 10 is turned on. Furthermore, the sensors provided in communication terminal device 10 are merely examples.

Variation 4

Communication terminal device 10 is not limited to a smartphone, and may be another mobile communication terminal device that carries out communication for voice calls, such as a featurephone. In such a communication terminal device, a part held in the user's hand and used is a transmitter/receiver for sending and receiving voice.

Variation 5

The communication terminal device according to the present invention can also be applied in a communication terminal device that produces bone conduction sound expressing received voice in the user's body. This communication terminal device is configured such that the user can make a voice call even when the device is in contact with a part of the user's head area aside from the ear.

Additionally, the communication terminal device according to the present invention need not be a communication terminal device used while the user holds the device in his/her hand during a voice call. The communication terminal device according to the present invention may be what is known as a wearable terminal, such as a headphone type or an earphone type that is used while being worn on the user's head area. This is because in the case where an incoming voice call is received in a state where the user is not wearing the communication terminal device, the user will start the voice call after first picking up the communication terminal device in his/her hand and then placing the device on his/her head area. Operations carried out by this communication terminal device in the case where an incoming voice call is received are the same as in the above-described embodiments, and thus descriptions thereof will be omitted.

Variation 6

The functions implemented by control unit 11 of communication terminal device 10 in the above-described embodiments can be implemented by a combination of a plurality of programs, or by a plurality of hardware resources working cooperatively. In the case where the functions of control unit 11 are realized using programs, the programs may be provided stored in a computer-readable recording medium such as a magnetic recording medium (magnetic tape, a magnetic disk (a Hard Disk Drive (HDD), a Flexible Disk (FD), or the like), an optical recording medium (an optical disk or the like), a magneto-optical recording medium, or a semiconductor memory; or may be distributed over a network. The present invention can also be understood as an incoming call control method.

DESCRIPTION OF REFERENCE NUMERALS

10 . . . communication terminal device
11 . . . control unit
111 . . . measurement unit
112 . . . proximity detection unit
113 . . . operation detection unit
114 . . . voice call control unit
114A . . . answering unit
114B . . . hold/hangup control unit
114C . . . voice transmission control unit
115 . . . notification processing unit
116 . . . storage control unit
12 . . . touch screen unit
121 . . . display unit 121A ... display region
122 ... touch sensor
13 ... wireless communication unit
14 ... microphone
15 ... speaker
16 ... accelerometer
17 ... gyrosensor
18 ... proximity sensor
19 ... storage unit

The invention claimed is:

1. A mobile communication terminal device comprising:
a speaker;
a microphone;
an answering unit that responds to an incoming voice call;
a measurement unit that measures an orientation or a displacement of the communication terminal device;
a proximity detection unit that detects when a head area of a user is close to the communication terminal device; and
an operation detection unit that detects a predetermined operation being made by the user using the communication terminal device,
wherein the answering unit responds to the incoming call in the case where, after an orientation of the mobile communication terminal has changed from a first orientation occurring when the incoming call was received to a second orientation in which the speaker and the microphone are positioned corresponding to an ear and a mouth of the user, respectively, the head area is detected as being close to the communication device;
the mobile communication terminal device further comprising a call termination control unit that terminates the voice call in the case where the head area is no longer detected as being close to the communication terminal device and an orientation of the mobile communication terminal which is substantively same as the first orientation is again detected.

2. The communication terminal device according to claim 1, further comprising:
a storage unit that stores, in advance, voice data expressing voice inputted by the user; and
a voice transmission control unit that sends the voice expressed by the stored voice data in the case where the voice call has been started by a response from the answering unit.

3. The communication terminal device according to claim 1,
wherein the operation is input of the user's voice, and the communication terminal device further comprises:
a storage unit that stores voice data;
a storage control unit that causes the voice data expressing the inputted user's voice to be stored in the storage unit; and
a voice transmission control unit that sends the voice expressed by the stored voice data in the case where the voice call has been started by a response from the answering unit.

4. The communication terminal device according to claim 1,
wherein a hangup control unit terminates the voice call in the case where the first orientation occurring when the incoming call was received has been measured after the voice call is started by a response from the answering unit, and the head area is no longer detected as being close to the communication terminal device.

5. The communication terminal device according to claim 1,
wherein a hangup control unit terminates the voice call in the case where a change in the orientation or displacement over time measured after the voice call has been started by a response from the answering unit is the reverse of a change in the orientation or the displacement over time measured when the incoming call was received, and the head area is no longer detected as being close to the communication terminal device.

6. The communication terminal device according to claim 1, wherein a hangup control unit terminates the voice call in the case where, after the voice call has been started by a response from the answering unit, a predetermined keyword is recognized from voice inputted by the user and the head area is no longer detected as being close to the communication terminal device.

7. The mobile communication terminal device according to claim 1, wherein when the first orientation is an orientation in which a screen of the mobile communication terminal faces downward, and the call termination control unit terminates the voice call when the screen is facing downward and holds the voice call if the screen is facing upward.

8. An incoming call control method for a mobile communication terminal device comprising:
a step of responding to an incoming voice call;
a step of measuring an orientation or a displacement of the communication terminal device;
a step of detecting when a head area of a user is near the communication terminal device; and
a step of detecting a predetermined operation being made by the user using the communication terminal device,
wherein in the step of responding, a response to the incoming call is made in the case where, after an orientation of the mobile communication terminal has changed from a first orientation occurring when the incoming voice call was received to a second orientation in which a speaker and a microphone are positioned according to an ear and a mouth of the user, respectively, the head area is detected as being close to the communication device;
the communication terminal device comprising a call termination control unit that terminates the voice call in the case where the head area is no longer detected as being close to the communication terminal device and an orientation of the mobile communication terminal which is substantively same as the first orientation is again detected.

9. A non-transitory readable program stored instructions in a memory and executable by a processor in a mobile communication terminal device to implement a method including the following:
a step of responding to an incoming voice call;
a step of measuring an orientation or a displacement of the communication terminal device;
a step of detecting when a head area of a user is near the communication terminal device; and
a step of detecting a predetermined operation being made by the user using the communication terminal device,
wherein in the step of responding, a response to the incoming call is made in the case where, after an orientation of the mobile communication terminal has changed from a first orientation occurring when the incoming call was received to a second orientation in which a speaker and a microphone are positioned corresponding to an ear and a mouth of the user, respectively, the head area is detected as being close to the communication device;

the mobile communication terminal device comprising a call termination control unit that terminates the voice call in the case where the head area is no longer detected as being close to the communication terminal device and an orientation of the mobile communication terminal which is substantively same as the first orientation is again detected.

* * * * *